United States Patent [19]

Dietmar et al.

[11] Patent Number: 5,043,075

[45] Date of Patent: Aug. 27, 1991

[54] METHOD OF REMOVING AMINES

[75] Inventors: Korger Dietmar, Steinbach; Stephan Astegger; Dieter Eichinger; Heinrich Firgo, all of Vöcklabruk, Austria

[73] Assignee: Lenzing Aktiengesellschaft, Lenzing, Austria

[21] Appl. No.: 528,578

[22] Filed: May 24, 1990

[30] Foreign Application Priority Data

Jun. 8, 1989 [AT] Austria ............................... A1415/89

[51] Int. Cl.$^5$ ............................................. B01D 15/04
[52] U.S. Cl. .................................. 210/664; 210/670; 210/677; 210/673; 203/41
[58] Field of Search .................. 203/41; 210/664, 677, 210/670, 673

[56] References Cited

U.S. PATENT DOCUMENTS

| | | | |
|---|---|---|---|
| 2,585,490 | 2/1952 | Olsen | 210/664 |
| 3,475,330 | 10/1969 | Gilles | 210/25 |
| 3,939,071 | 2/1976 | Katzakian | 210/674 |
| 4,197,195 | 4/1980 | Ochsenfeld et al. | 210/664 |
| 4,518,503 | 5/1985 | Fermaglich | 210/664 |
| 4,655,929 | 4/1987 | Tanaka et al. | 210/664 |
| 4,904,383 | 2/1990 | Auerswald | 210/269 |

FOREIGN PATENT DOCUMENTS 336510  5/1977  Austria .
1073582  6/1967  United Kingdom .

OTHER PUBLICATIONS

Isaeva et al., *Khim. Prom-st.* (Moscow) 1983 (2); pp. 83–85 (English abstract).

*Primary Examiner*—Stanley S. Silverman
*Assistant Examiner*—Cynthia L. Nessler
*Attorney, Agent, or Firm*—Brumbaugh, Graves, Donohue & Raymond

[57] ABSTRACT

There is disclosed a method of removing amines from aqueous solutions thereof, in particular from waste waters obtained in cellulose processing. The aqueous amine solutions are contacted with a cation exchanger whose anchor groups consist of carboxyl groups, in order to charge the cation exchanger with the amines. The charged cation exchanger is treated with an aqueous solution of a weak acid having a $pK_a$ larger than 3.0 in order to elute the amines. The eluate is processed by way of distillation, wherein a portion of the weak acid is separated from the amines and reclaimed, if desired.

The method according to the invention offers a simple and cheap way of disposing amine-containing waste waters.

5 Claims, No Drawings

METHOD OF REMOVING AMINES

The invention relates to a method of removing amines from aqueous solutions thereof, in particular from waste waters obtained in certain cellulose processing methods.

Such amine solutions constitute a problem of waste disposal, because hitherto no method has been known, by which amines can be removed from such waste waters in high yields and in a simple manner. Many amines are known to be toxic and difficult to degrade.

Distillative separation methods are described in the literature. Yet, at amine concentrations of 0.01 to 5% by weight, these methods involve several steps, thus being rather complex and uneconomic.

Even various extraction methods have been tested for removal, having been combined with subsequent distillation. Such a method is known, for instance, from GB-B-1 073 582. However, the amines cannot be removed completely according to this method.

In the journal Khim.Prom-st. (Moscow) 1983 (2), pp. 83 to 85, a method of completely removing morpholine from waste waters is described. According to this method, removal is effected by means of ion exchange. The disadvantage of this method consists in that a plurality of ion exchangers, i.e., two strongly acidic cation exchangers combined with an anion exchanger, must be used and that the morpholine-containing eluates resulting from regeneration are strongly acidic and must be neutralized with adequately large amounts of caustic solution prior to further processing. However, the salts incurred entrain morpholine during crystallization, which, in turn, is disadvantageous in that the salt cannot be waste-disposed directly, but only after further regeneration.

The invention has as its object to eliminate these disadvantages and to provide a simple method of removing amines from aqueous solutions thereof, which is feasible in a cost-saving manner requiring no neutralization step and no energy-consuming separation and regeneration steps.

The method according to the invention is characterized by the combination of the following measures:
  contacting the aqueous amine solutions with a cation exchanger whose anchor groups consist of carboxyl groups, in order to charge the cation exchanger with the amines,
  treating the charged cation exchanger with an aqueous solution of a weak acid having a $pK_a$ larger than 3.0 in order to elute the amines, and
  processing the eluate by way of distillation, with a portion of the weak acid being separated from the amines and reclaimed, if desired.

By the ion exchanger used according to the invention, the amines both can be removed practically quantitatively in a single pass and can be re-eluted with weak acids. Among these, volatile acids having boiling points of below 120° C., such as formic acid, acetic acid or carbonic acid, have proved particularly suitable.

An advantageous embodiment of the method according to the invention consists in that the pH of the aqueous solution of the acid ranges between 1.7 and 2.8.

The eluate, which contains the amines, acid and water, is further processed by distillation, the distillate containing the acid, water and merely traces of amines and, thus, being apt for recycling into the process. It may, for instance, be used for rinsing the ion exchanger after regeneration. Moreover, it is possible to prepare a fresh regenerant solution by adding concentrated acid. The amines remain in the distillation residue in the form of ammonium salts, e.g., as formates and acetates, together with acid residues. The amines present in a concentrated form can be further processed according to various methods described in the literature or, preferably, can be disposed by being burnt completely.

The invention will be explained in more detail by way of the following examples.

EXAMPLE 1

50 ml LEWATIT CNP 80 (a cation exchanger whose anchor groups consist of carboxyl groups) (manufacturer: Bayer AG) were charged with 100 ml of an aqueous solution containing 4.9 g N-methyl morpholine (pH = 10.03). Subsequent elution was effected with 200 ml 10% acetic acid. The eluate contained 4.6 g N-methyl morpholine. After this, the ion exchanger was washed with 400 ml distilled water. An additional 0.2 g N-methyl morpholine was found in the washings.

Thus, the amine was removed from the aqueous solution by 98% and readily disposed by burning. The distillate was used to prepare new elution solutions.

EXAMPLE 2

50 ml LEWATIT CNP 80 were charged with 500 ml waste water from cellulose processing (pH = 10.31) containing 0.15% by weight N-methyl morpholine and morpholine. Elution was effected with 150 ml 10% acetic acid, whereupon washing was performed with 300 ml distilled water. Subsequently, distillation was carried out, 42.6 g condensate with an acetic acid concentration of 3.3 % being obtained from 123 g eluate (acetic acid concentration: 4.7%). The distillation residue was comprised of 5.5% acetic acid, 0.36% amine and water. By adding acetic acid to this, the elution solution for the following Example 3 was prepared, the amine having no adverse effect.

The amine was removed from the waste water by 94%.

EXAMPLE 3

50 ml LEWATIT CNP 80 were charged with 1000 ml waste water (pH = 9.88) containing 2.86 g N-methyl morpholine. Subsequently, elution was effected with the distillation residue incurred in Example 2 and enriched with acetic acid to 10.4%. Thereby, the amine concentration fell to 1.54%. 148.2 g of this solution were required for elution. 198.2 g eluate incurred, containing 6.09% acetic acid and 2.18% amine. Thus, 72% of the amine could be eluted even without washing.

Processing and disposal were effected as in Example 1.

What we claim is:

1. A method of removing amines form an aqueous solution containing amines, which method comprises the steps of
  providing a cation exchanger having anchor groups essentially consisting of carboxyl groups,
  contacting said aqueous amine solution with said cation exchanger so as to obtain said cation exchanger charged with said amines,
  preparing an aqueous acid solution of a weak acid having a $pK_a$ larger than 3.0,
  treating said cation exchanger charged with said amines with said aqueous acid solution so as to elute said amines, thus obtaining an eluate, and processing said eluate by way of distillation so as to cause a portion of said weak acid to be separated from said amines.

2. A method as set forth in claim 1, further comprising the step of reclaiming said portion of said weak acid separated from said amines.

3. A method as set forth in claim 1, wherein said weak acid has a boiling point of below 120° C.

4. A method as set forth in claim 1, wherein said weak acid is selected from the group consisting of formic acid, acetic acid and carbonic acid.

5. A method as set forth in claim 1, wherein said aqueous acid solution of said weak acid has a pH ranging between 1.7 and 2.8.

* * * * *

UNITED STATES PATENT AND TRADEMARK OFFICE
CERTIFICATE OF CORRECTION

PATENT NO. : 5,043,075

DATED : August 27, 1991

INVENTOR(S) :

It is certified that error appears in the above-identified patent and that said Letters Patent is hereby corrected as shown below:

Title Page : Item 75, first line, "Korger Dietmar" should read --Dietmar Korger--;

Title Page : Item 75, third line, "Vöcklabruk" should read --Vöcklabruck--;

Col. 2, line 56, "form" should read --from--.

Item (19) "Dietmar" should read --Korger --.

Signed and Sealed this

Second Day of March, 1993

Attest:

STEPHEN G. KUNIN

*Attesting Officer*    Acting Commissioner of Patents and Trademarks